Patented Sept. 23, 1924.

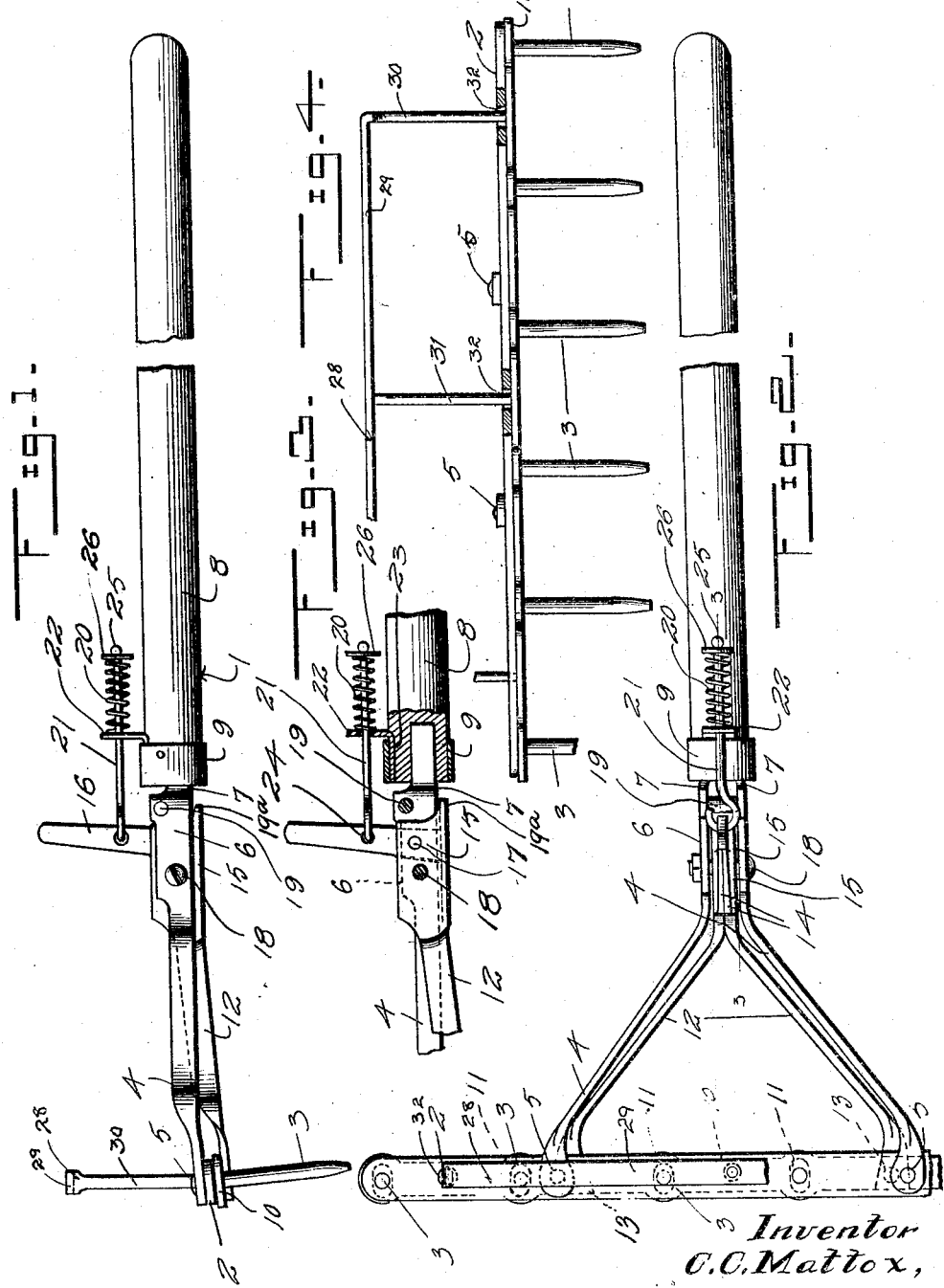

1,509,679

UNITED STATES PATENT OFFICE.

CHARLES C. MATTOX, OF ROCKBRIDGE, OHIO.

RAKE CLEANER.

Application filed June 13, 1919. Serial No. 303,985.

*To all whom it may concern:*

Be it known that I, CHARLES C. MATTOX, a citizen of the United States, residing at Rockbridge, in the county of Hocking and State of Ohio, have invented certain new and useful Improvements in Rake Cleaners; and I do hereby declare the following to be a full, clear, and exact description of the invention, such as will enable others skilled in the art to which it appertains to make and use the same.

This invention relates to rake cleaners and the primary object of the invention is to provide an improved attachment for hand rakes, which is adapted to be operated by the used of the rake for cleaning the rake teeth.

Another object of the invention is to provide a stripping plate movable in relation to the teeth of the rake which can be quickly and readily operated, so as to effectively remove débris clinging to and between the teeth of the rake.

A further object of the invention is to provide improved means for mounting the stripping plate on the rake head and an improved means for operating the same.

A still further object of the invention is to provide an improved device of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a side elevation of the improved rake cleaner,

Figure 2 is a top plan view of the same,

Figure 3 is a longitudinal section taken on the line 3—3 of Figure 2,

Figure 4 is a fragmentary front elevation partly in section of the rake head and cleaner.

Referring to the drawings by reference numerals, 1 designates a rake, the head of which consists of a bar 2 and teeth 3. The shank of the rake comprises forwardly diverging portions 4 secured at their front ends to the bar 2 at 5, intermediate relatively spaced parallel portions 6, and rear parallel contacting portions 7 secured in the front end of the handle 8 by a ferrule 9.

The cleaner comprises a stripping plate 10 having transversely extending slots 11 to receive the teeth 3. The stripping plate 10 is secured by elements 13 to the front ends of forwardly diverging arms 12. A U-shaped coupling 15 receives the lower end of an upstanding arm 16 which is rigidly secured thereto by a rivet 17. The inner end portions 14 of arms 12 are disposed in the coupling 15 in contiguous relation with upstanding arm 16 and the bottom wall of the coupling so that a bolt or retaining element 18 will secure the arms 12 rigidly, but detachably, to the coupling. The arms 12, clamp 15 and the upstanding arm 16 constitute a bell-crank lever which is pivoted by said bolt 18 to and between the intermediate portions 6 of the shank 4.

The stripping plate 10 is normally held in its raised or inoperative position by a compression spring 20 which is mounted upon a rod 21 between a bracket 22 and a disk 26. The bracket 22 is secured to the handle 8 by the ferrule 9. The rod 21 is secured to the upstanding arm 16, passes through the bracket 22, and has its rear end offset as at 25 to prevent displacement of the disk 26.

When it is desired to clean the rake, the stripping plate 10 is moved downwardly with respect to the teeth 3 through the medium of a hand bar 28 which is located above the bar 2 of the head of the rake and which is connected to the stripping plate 10 by the rods 30 and 31 which pass through openings 32 in the bar 2. The downward movement of the stripping plate 10 is limited by a rearwardly extending lug 19ª on the coupling 15 and a stop 19 carried by the intermediate portions 6 of the shank of the rake. When the stripping plate 10 is moved downwardly, spring 20 is tensioned, and owing thereto the stripping plate is returned to its normal position against the under side of the bar 2 immediately upon the release of the hand bar 28, and it is held in such position against accidental displacement until it is again moved downwardly to clean the rake.

What I claim as new is:

1. A rake having a stripping plate, arms extending rearwardly from said plate, a U-shaped coupling, an upstanding arm rigid with said coupling having its lower portion disposed between the side walls of the coupling, the rear ends of said arms being disposed between the side walls of the coupling contiguous with the upstanding arm and with the bottom wall of the coupling, and a retaining element passing through said coupling and first mentioned arms.

2. A rake having a handle, a head, a shank extending rearwardly from said head and from which said handle extends, a stripping plate movably associated with said head, arms extending rearwardly from said plate, a U-shaped coupling within which the rear ends of said arms are disposed, said coupling at one end portion projecting rearwardly beyond said arms, said end portion having a lug, an upstanding arm having its lower end positioned in said projecting portion, a retaining element passing through said coupling and upstanding arm, the rear portions of the first mentioned arms being contiguous with the upstanding arm, and with the bottom wall of the coupling, a retaining element pivotally mounted on the shank and passing through said coupling and first arms to rigidly secure the latter to the coupling, a stop carried by said shank in cooperative relation to the lug to limit the cleaning stroke of said plate, and yielding means associated with said upstanding arm and handle to hold said plate in normal position.

In testimony whereof I affix my signature in presence of two witnesses.

CHARLES C. MATTOX.

Witnesses:
GEORGE W. ZIEGLER,
W. A. ROBINSON.